United States Patent

[11] 3,619,644

[72] Inventor Eric Andre Vittoz
Cernier, Switzerland
[21] Appl. No. 80,696
[22] Filed Oct. 14, 1970
[45] Patented Nov. 9, 1971
[73] Assignee Centre Electronique Horloger SA
Neuchatel, Switzerland
[32] Priority Oct. 31, 1969
[33] Switzerland
[31] 16264/69

[54] FREQUENCY DIVIDING CIRCUIT

4 Claims, 3 Drawing Figs.

[52] U.S. Cl. .......... 307/225, 307/279, 307/291
[51] Int. Cl. .......... H03k 21/06
[50] Field of Search .......... 307/279, 291, 225

[56] References Cited

UNITED STATES PATENTS

| | | | |
|---|---|---|---|
| 3,284,782 | 11/1966 | Burns .......... | 307/279 X |
| 3,363,115 | 1/1968 | Stephenson et al. .......... | 307/291 X |
| 3,493,785 | 2/1970 | Rapp .......... | 307/279 |
| 3,548,388 | 12/1970 | Sonoda .......... | 307/291 X |

*Primary Examiner*—John S. Heyman
*Attorney*—Stevens, Davis, Miller & Mosher

ABSTRACT: A frequency dividing circuit comprises at least one logic structure satisfying the Boolian relationships $A=\overline{\bar{B}I_1+\bar{A}I_2}$ and $B=\overline{\bar{B}I_1+AI_2}$ in which $I_1$ and $I_2$ are two complementary input quantities and A and B two output quantities. The logic structure comprises three pairs of field effect transistors each having a source, a drain and a gate, and two outputs each connected to the drains of the two transistors of the first pair and the second pair respectively. The sources of one transistor of the first pair and of one transistor of the second pair are separately connected to the drain of one of the transistors of the third pair, the sources of the two other transistors of the first and second pairs are connected together to the drain of a seventh transistor, and the sources of the two transistors of the third pair and of the seventh transistor are connected to a terminal of a voltage source.

FREQUENCY DIVIDING CIRCUIT

BACKGROUND OF THE INVENTION

This invention relates to an improvement in our copending application Ser. No. 875,680 which concerns a frequency dividing circuit comprising at least one logic structure satisfying the Boolian relationships $$A=\overline{\bar{B}I_1\bar{A}I_2} \text{ and } B=\overline{\bar{B}I_1+AI_2}$$

in which $I_1$ and $I_2$ are two complementary input quantities and A and B two output quantities, the logic structure comprising three pairs of field effect transistors each having a source, a drain and a gate, and two outputs each connected to the drains of the two transistors of a first and second pair respectively.

Referring to FIG. 8 of copending application Ser. No. 875.680 the transistors 33 and 37 can be caused to simultaneously conduct which disturbs operation of the divider when the output A supports a capacitative charge much larger than the output B, or vice versa. It is found experimentally that difficulties arise when the ratio of these capacitive charges is greater than about 10.

OBJECT OF THE INVENTION

It is an object of the invention to eliminate this drawback and to provide an improvement in the embodiment shown in FIG. 8 of copending application Ser. No. 875,680.

DEFINITION OF THE INVENTION

According to the invention, a frequency dividing circuit comprises at least one logic structure satisfying the Boolian relationships $$A=\overline{\bar{B}I_1\bar{A}I_2} \text{ and } B=\overline{\bar{B}I_1+\bar{A}I_2}$$

in which $I_1$ and $I_2$ are two complementary input quantities and A and B two output quantities. The logic structure comprises three pairs of field effect transistors each having a source, a drain and a gate, and two outputs each connected to the drains of the two transistors of the first pair and the second pair respectively. The sources of one transistor of the first pair and of one transistor of the second pair are separately connected to the drain of one of the transistors of the third pair, the sources of the two other transistors of the first and second pairs are connected together to the drain of a seventh transistor, and the sources of the two transistors of the third pair and of the seventh transistor are connected to a terminal of a voltage source.

DESIGNATION OF THE DRAWINGS

An embodiment of a frequency dividing circuit according to the invention will now be described, by way of example, with reference to the accompanying drawings, in which.

DESCRIPTION OF A PREFERRED EMBODIMENT

Figure 1:
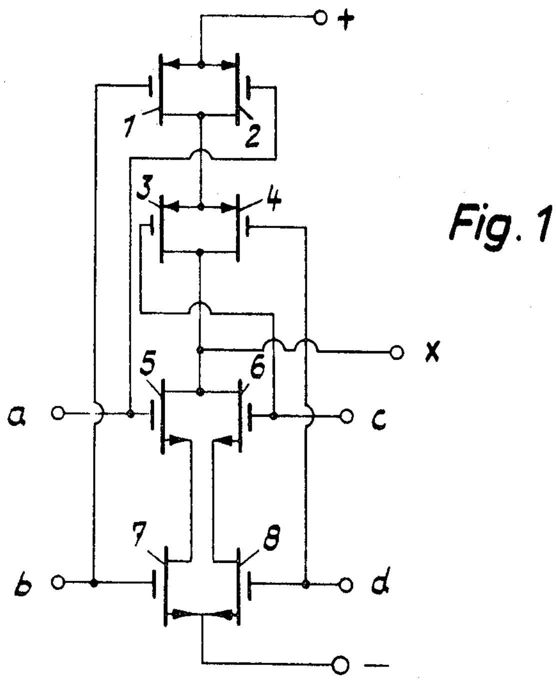
FIG. 1 is a diagram of a combined AND-NOR gate.

The binary dividers described in copending application Ser. No. 875,680 satisfying the equations $$A=\overline{\bar{B}I_1\bar{A}I_2} \text{ and } B=\overline{\bar{B}I_1+AI_2}$$

are provided by assembling two logical inversers and two combined AND-NOR gates, one of which is shown in FIG. 1, in its version with complementary MOSTs (i.e. isolated gate field effect transistors, also known as "IGFET"). This gate comprises four *p*-type MOST 1, 2, 3 and 4 and four *n*-type MOST 5, 6, 7 and 8. It is easy to verify that this combined gate corresponds to the logic equation $$x=\overline{ab+cd}$$

which gives $$A=\overline{\bar{B}I_1\bar{A}I_2}$$

if we put $a=\bar{B}, b=I_1, c=\bar{A}$, and $d=_2$.

Figure 2:
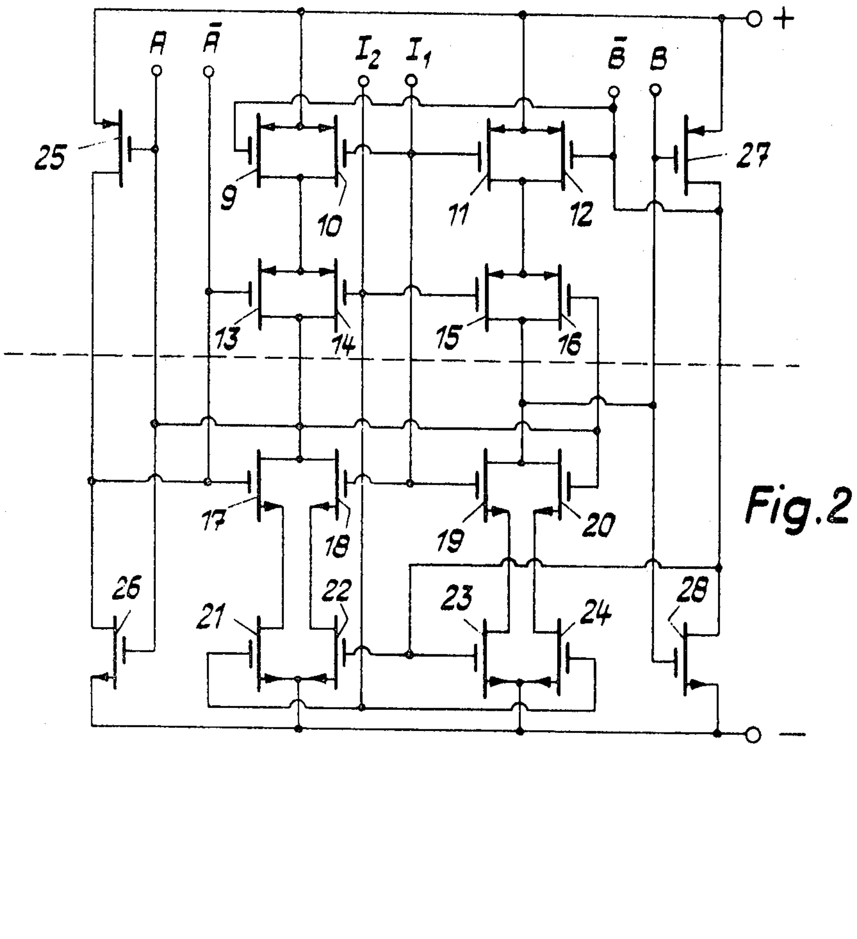
FIG. 2 is an explicative diagram of the contraction process.

This assembly gives the circuit of FIG. 2, composed of ten pairs of MOST 9–10, 11–12, 13–14, 15–16, 17–18, 19–20, 21–22, 23–24, 25–26, 27–28. The two combined AND-NOR gates respectively comprise the pairs 9–10, 13–14, 17–18, 21–22, and 11–12, 15–16, 19–20, 23–24. The two inversers are respectively formed by the pairs 25–26 and 27–28 which convert the variable A into $\bar{A}$ and the variable B into $\bar{B}$ respectively. It is seen that the embodiment of FIG. 8 of copending application Ser. No. 875.680 was obtained by contracting the MOST 10–11, 9–12, 21–24, 22–23 two by two. This embodiment thus comprises only eight pairs. An examination shows that under certain conditions, for example when $I_1=1$, the transistors 33 and 37 shown in the said FIG. 8 conduct simultaneously, the contractions carried out tending to make $$A=B,$$

which disturbs operation of the divider when A bears a much larger capacitative charge than B, or vice versa. It is found experimentally that difficulties arise when the ratio of these capacitative charges is greater than about 10. These difficulties disappear if the contractions 10–11, 9–12, and 22–23 are eliminated. There is thus obtained the diagram of FIG. 3 in which the MOST 29 replaces the MOST 21 and 24. It is seen that three of the four contractions, which were effected to pass from the diagram represented in the accompanying FIG. 2 to the diagram of FIG. 8 of copending application Ser. No. 875.680, are eliminated.

Figure 3:
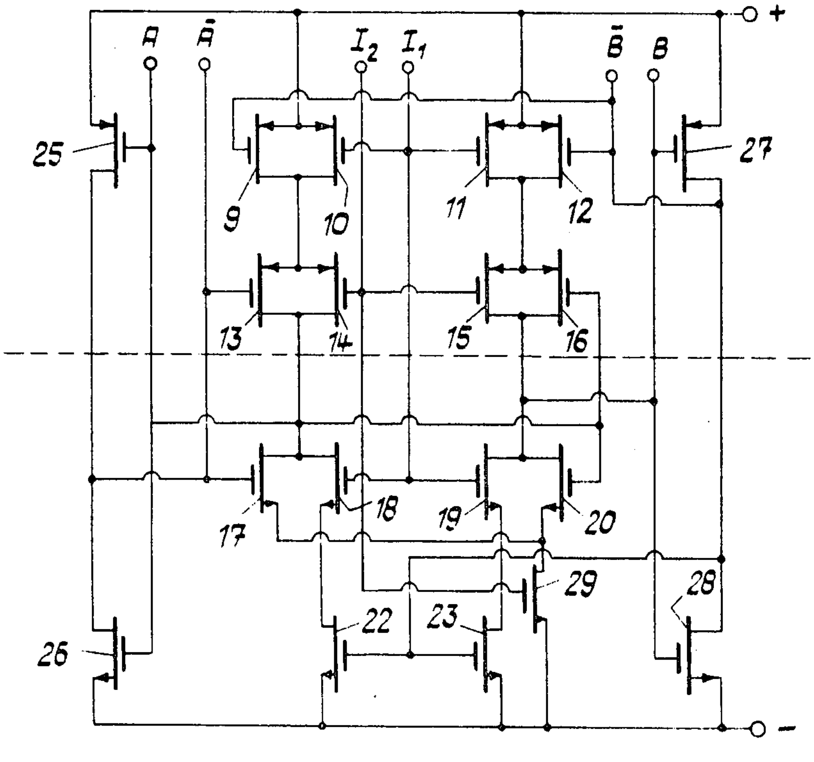
FIG. 3 is a diagram of the embodiment.

Referring to FIG. 3, the logic structure comprises three pairs of field effect transistors, 17–18; 19–20; and 22–23, each having a source, a drain and a gate. An output A is connected to the drains of the transistors 17, 18 of the first pair and an output B is connected to the drains of the two transistors 19, 20 of the second pair. The sources of the transistor 18 of the first pair and of the transistor 19 of the second pair are respectively connected to the drains of the transistors 22 and 23 of the third pair; the sources of the transistors 17 and 20 are connected together to the drain of a seventh transistor 29; and the sources of the transistors 22 and 23 of the third pair and of the seventh transistor 29 are connected to the negative terminal of a voltage source.

The logic structure additionally comprises fourth, fifth, sixth and seventh pairs of field effect transistors 9–10; 11–12; 13–14; and 15–16 respectively, the two sources and the two drains of each pair being respectively connected together. The sources of the fourth pair 9–10 and the fifth pair 11–12 are connected to the positive terminal of the voltage source. The drains of the fourth and fifth pairs are respectively connected to the sources of the sixth pair 13–14 and the seventh pair 15–16 the drains of which are connected to the drains of the first pair 17–18 and the second pair 19–20. The transistors of the first three pairs as well as the seventh transistor are of a type opposed to that of the transistors of the fourth, fifth, sixth and seventh pairs.

The logic structure also comprises two inversers 25–26 and 27–28 each formed by a pair of field effect transistors of opposed types.

The described frequency dividing circuit preferably comprises a plurality of binary stages, the circuit being provided in integrated form in one and the same substrate, the *n*-type transistors of all of the stages being formed in a *p*-type region of the substrate and the *p*-type transistors of all of the stages being formed in an *n*-type region of this substrate.

The described circuit bears any capacitative charges whatsoever on A and B at the cost of three MOST more than in the circuit according to the said FIG. 8.

What is claimed is:

1. A frequency dividing circuit comprising at least one logic structure satisfying the Boolian relationships $$A=\overline{\bar{B}I_1AI_2} \text{ and } B=\overline{\bar{B}I_1+AI_2}$$

in which $I_1$ and $I_2$ are two complementary input quantities and A and B two output quantities, the logic structure comprising three pairs of field effect transistors (17–18; 19–20; 22–23) each having a source, a drain and a gate, and two outputs (A,B) each connected to the drains of the two transistors of the first pair and the second pair respectively, the sources of a transistor (18) of the first pair and of a transistor (19) of the second pair being separately connected to the drain of one of the transistors (22,23) of the third pair, and the sources of the two other transistors (17,20) being connected together to the drain of a seventh transistor (29), the sources of the two transistors of the third pair and of the seventh transistor being connected to a terminal of a voltage source.

2. A circuit according to claim 1, comprising fourth, fifth, sixth and seventh pairs of field effect transistors (9–10; 11–12; 13–14; 15–16), the two sources and the two drains of each pair being respectively connected together, the sources of the fourth pair (9–10) and fifth pair (11–12) being connected to the other terminal of the said voltage source, the drains of the fourth and fifth pairs being respectively connected to the sources of the sixth pair (13–14) and the seventh pair (15–16) the drains of which are connected to the drains of the first pair (17–18) and the second pair (19–20), the transistors of the three first pairs as well as the said seventh transistor being of a type opposed to that of the transistors of the fourth, fifth, sixth and seventh pairs.

3. A circuit according to claim 2, comprising two inversers (25–26; 27–28) each formed by a pair of field effect transistor of opposed types.

4. A circuit according to claim 2, comprising two inversers (25–26; 27–28) each formed by a pair of field effect transistors, of opposed types, and a plurality of binary stages, the circuit being provided in integrated form in one and the same substrate, the *n*-type transistors of all of the stages being formed in a *p*-type region of the substrate and the *p*-type transistors of all of the stages being formed in an *n*-type region of this substrate.

* * * * *